March 25, 1952     H. H. RUMPEL     2,590,795
GYRATORY CRUSHER
Filed April 7, 1948
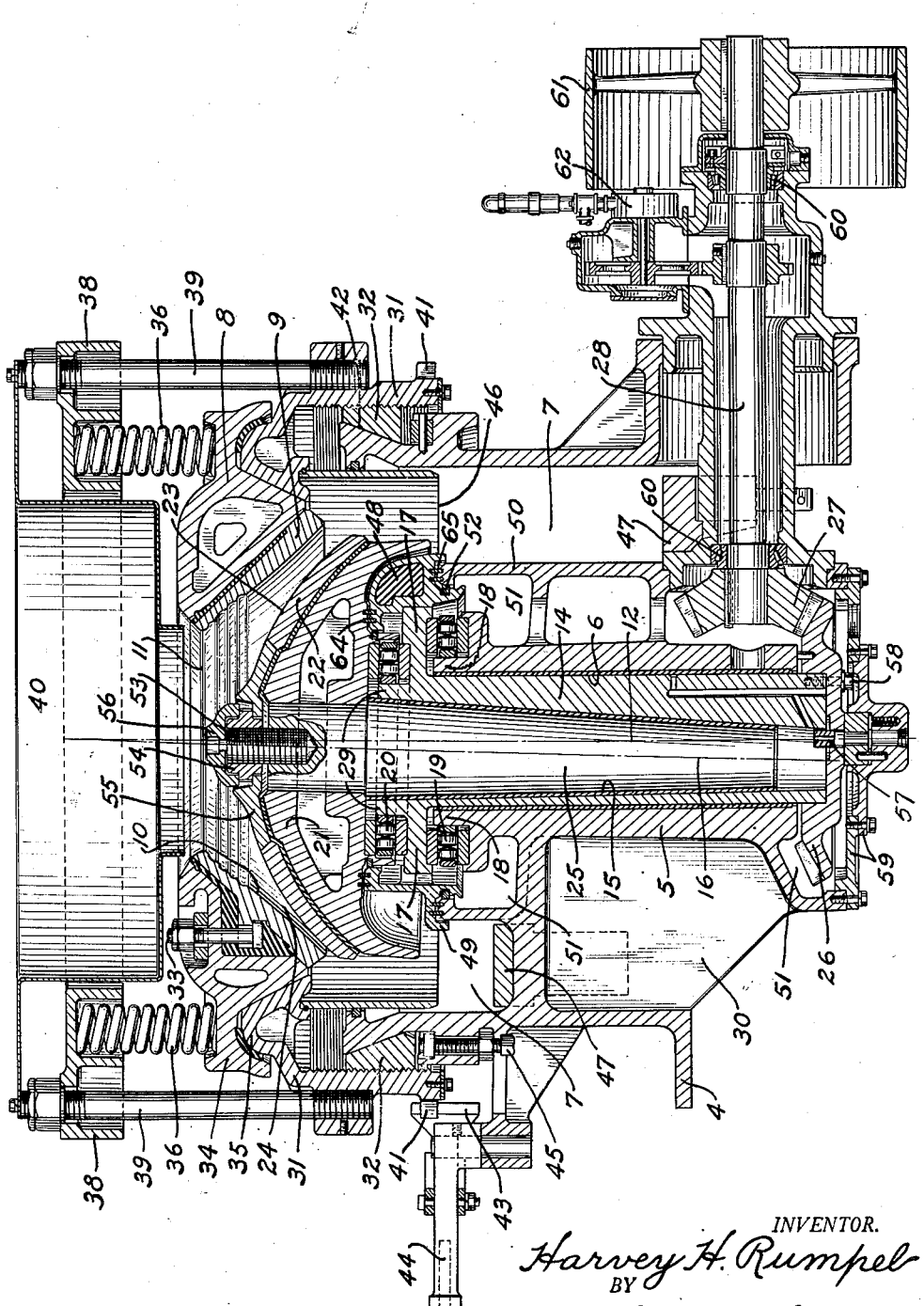
INVENTOR.
Harvey H. Rumpel
BY
Lieber & Lieber
ATTORNEYS Patented Mar. 25, 1952

2,590,795

UNITED STATES PATENT OFFICE 2,590,795

GYRATORY CRUSHER

Harvey H. Rumpel, Whitefish Bay, Wis., assignor to Smith Engineering Works, Milwaukee, Wis., a corporation of Wisconsin Application April 7, 1948, Serial No. 19,470
In Canada June 17, 1947

3 Claims. (Cl. 241—216)

The present invention relates generally to improvements in the crusher art, and relates more specifically to improvements in the construction and operation of gyratory crusher for reducing hard substances such as rock, ore and the like; and this application is a continuation in part of my prior application, Serial No. 729,708, filed February 20, 1947, now abandoned.

The primary object of my invention is to provide an improved gyratory crusher which is simple and durable in structure, and which is also highly efficient in operation.

Many different types of gyratory crushers for reducing hard substances such as rock and ore, have heretofore been proposed and used extensively, and some of these prior gyratory reduction crushers are operable at high speed and with relatively extensive crushing stroke in order to utilize impact as well as mere pressure in effecting rapid and efficient crushing. These impact gyratory crushers ordinarily employ a relatively long upright eccentric revolvable at high speed within a sturdy frame in order to gyrate a freely rotatable crushing head cooperating with a fixed crushing concave to form an annular outwardly and downwardly flaring crushing zone; and the actuating eccentric of each of these prior machines, is ordinarily mounted upon a stationary thrust bearing coacting with the lower end thereof, while the crushing head coacts with the opposite upper end of the eccentric through a revolving thrust bearing, the intervening portion of the eccentric serving as a guide bearing coacting with the fixed frame and with the head journal shaft. These remotely separated thrust bearings are preferably of the anti-friction type, as shown in my prior Patent No. 1,993,900, granted March 12, 1935, and when the head is gyratable and rotatable about an axis which is inclined relative to the central vertical axis of the eccentric, the stationary thrust bearing is disposed horizontal or perpendicular to this central axis, while the revolvable thrust bearing is disposed perpendicular to the inclined eccentric axis, that is, at an inclination relative to the horizontal fixed bearing.

It has been discovered, that this widely separated disposition of the thrust bearings associated with the opposite ends of the elongated eccentric, tends to produce uneven loading of the intervening external eccentric guide bearing thus introducing extremely high and excessive local pressures which cause undesirably rapid bearing failures. It has also been found that the wide separation of these thrust bearings and the mounting of the eccentric upon a fixed thrust bearing located remote from the crushing zone, permits the elongated eccentric to tilt relative to the stationary thrust bearing, thus also causing relatively rapid and non-uniform wear in this thrust bearing and in the outer guide bearing. The location of the other or revolving thrust bearing near the crushing zone and between the head and the eccentric, is however perfectly satisfactory, since the internal eccentric guide bearing cooperates with this movable thrust bearing to positively prevent relative undesirable tilting of these coacting elements.

A proposal has heretofore been made, to eliminate the use of the relatively long internal and external eccentric guide bearings in crushers of this type, by providing ball bearings at the upper and lower ends of the eccentric sleeve separated by a long intervening space. In this prior proposal the eccentric is provided at its upper end with a flange the bottom of which coacts with the frame of the crusher through a ball bearing and the top of which coacts with the head through a similar ball bearing. The lower end of the eccentric also coacts with the crusher frame through an external ball bearing and with the head guiding shaft through an internal ball bearing, and the upper and lower sets of ball bearings are separated by the intervening vertical space which is devoid of contact between the eccentric and the frame and head. The ball bearings alone must therefore resist both the vertical and horizontal components of the enormous crushing pressures, and this is highly impractical because the ball bearings must be made too large and cumbersome to permit installation thereof within the available space. Then too, the ball bearings of this previous proposal were not properly mounted to maintain them accurately centralized relative to their respective axes of rotation, thus introducing further objection to the proposed structure.

It is therefore a more specific object of my present invention to provide an improved bearing assemblage for gyratory crushers, which functions to firmly confine the parts in proper relative position and thus vastly prolongs the life of such machines.

Another specific object of this invention is to provide improved bearings for the head and eccentric of a gyratory impact crusher, which will most effectively resist normal crushing pressures and will also positively eliminate tilting of the eccentric and of the head carried thereby relative to the main frame.

A further specific object of the invention is to provide an improved drive for gyratory reduction crushers or the like, which is extremely durable and efficient in operation, and which may also be quickly and conveniently assembled or dismantled.

Still another specific object of my invention is to provide an improved mounting for the actuating eccentric and crushing head of a high speed gyratory crusher, whereby the head is most efficiently freely rotatably supported upon and is effectively gyratable by the eccentric, while the latter is also most efficiently journalled for rotation relative to the main crusher frame.

An additional specific object of the present invention is to provide an improved bearing assemblage for the eccentric of a gyratory crusher actuating mechanism which is well protected against rapid wear and other possible damage, while being susceptible of abundant lubrication, during normal use.

These and other objects and advantages of the invention will be apparent from the following detailed description.

A clear conception of the various features constituting my present improvement, and of the mode of constructing and of operating a typical high speed gyratory reduction crusher, embodying the invention, may be had by referring to the drawing accompanying and forming a part of this specification, wherein like reference characters designate the same or similar parts.

The single figure of the drawing is a central vertical section through a typical high speed gyratory crusher embodying my improved head supporting and gyrating mechanism.

While the invention has been shown and described herein as being advantageously applicable to a high speed, long throw gyratory crusher wherein the concave is stationary and the head is supported and gyratable from beneath so as to provide an unobstructed feed inlet, it is not my desire or intention to unnecessarily restrict the scope of utility of the improvement by virtue of this limited disclosure.

Referring to the drawing, the high speed gyratory reduction crusher disclosed therein by way of illustration, comprises in general, a main frame 4 having an integral rigid central hub 5 provided with an upright bore 6 and also having therein an annular crushed material discharge space 7; a concave 8 carried by the frame 4 above the hub 5 and having a renewable liner 9 provided with an annular crushing surface 10 and with a central fresh material inlet opening 11 disposed coaxial relative to the central axis 12 of the frame bore 6; an elongated eccentric 14 having an outer cylindrical peripheral surface journalled for rotation in the frame bore 6 and also having an internal tapered eccentric bore 15 generated about an axis 16 which is inclined relative to and intersects the axis 12 near the feed opening 11, the eccentric 14 being provided with a rigid integral flange 17 projecting outwardly from its upper end and over the frame hub 5 and also having an integral annular extension 29 projecting upwardly beyond the flange 17; a lower annular roller-type thrust bearing 19 interposed between the bottom of the eccentric flange 17 and the top of the frame hub 5 and lying in a plane perpendicular to the vertical axis 12; a similar upper annular roller-type thrust bearing 20 disposed directly above the integral eccentric flange 17 and snugly surrounding the rigid extension 29 by lying in a plane perpendicular to the axis 16 and inclined relative to the axis 12; a head 21 coacting with the top of the flange 17 through the upper thrust bearing 20 and having a renewable main mantle 22 provided with an annular crushing surface 23 cooperating with the concave surface 10 to provide an outwardly and downwardly flaring crushing zone 24, the head 21 also being provided with a rigid central guide shaft 25 journalled for free rotation within the tapered eccentric bore 15; and a bevel gear 26 secured to the lower end of the eccentric 14 and coacting with a driving pinion 27 secured to the crusher driving shaft 28.

The main frame 4 should be of sturdy construction and the hub 5 has an integral upward extension 18 for centralizing the lower roller bearing 19 and is preferably cast integral with the outer frame wall being connected therewith by means of heavy integral ribs 39, and the upper crushing member or concave 8 is tiltably mounted upon a supporting ring 31 which is vertically adjustably secured to the outer frame wall by means of an annular split wedge 32. As shown, the concave liner 9 is provided with an approximately frustro-conical crushing surface 10 which cooperates with a spherical crushing surface 23 formed on the head mantle 22 to produce the flaring annular crushing zone 24, but these surfaces 10, 23 may be modified in shape to suit different operating conditions. The liner 9 is detachably secured to the concave 8 by bolts 33, and the concave 8 has an integral peripheral flange 34 which coacts with and is normally held snugly against an upper annular ridge 35 formed on the supporting ring 31, by means of an annular series of compression springs 36. These springs 36 press against the concave flange 34 and react against an annular retainer 38 which is connected to the supporting ring 31 by rods 39, and which also carries a feed hopper 40 having an outlet located in vertical alinement with the concave feed opening 11; and during abnormal conditions of operation of the crusher, the springs 36 may be compressed so as to permit the concave 8 to move away from the head 21 and to thus prevent damage to the unduly stressed crusher parts.

The lower portion of the concave supporting ring 31 is internally screw threaded while the exterior thereof is provided with an annular series of teeth 41, and the annular wedge 32 has peripheral screw threads cooperable with the threads of the ring 31 and has an internal tapered surface 42 which is wedgingly cooperable with a tapered external surface formed on the outer wall of the frame 4. A ratchet 43 which is operable by means of a lever 44 pivotally associated with the frame 4, is operable to revolve the supporting ring 31 about the annular wedge 32 so as to either raise or lower the concave 8 and to thereby vary the vertical width of the crushing zone 24, and the annular wedge 32 may be spread to lock the elements in adjusted position by means of jack screws 45 also carried by the main frame 4. In order to protect the adjusting mechanism from grit and dust, the concave supporting ring 31 is also provided with an annular apron 46 which sealingly coacts with the interior of the outer frame wall around the crushed material discharge space 7, and wear resistant shields 47 may also be provided above the frame ribs 33.

The elongated eccentric 14 which is journalled for rotation within the vertically elongated central bore 6 of the frame hub 5 and extension 18, preferably has the flange 17 and extension 29 formed integral with its upper end, and the weight of this eccentric as well as the major downward pressures exerted thereagainst, are obviously borne by this sturdy flange 17 so that the long frame bore 6 serves primarily only as a guide bearing for preventing lateral displacement of the upright eccentric. The anti-friction thrust bearings 19, 20 between which the flange 17 is interposed, are preferably of the annular roller type, each comprising a series of cylindrical rollers radiating from the bearing axis and having individual axes lying in a common plane; and the plane of the lower roller bearing 19 is disposed perpendicular to the central axis 12 of the eccentric guide bearing bore 6, while the plane of the upper roller bearing 20 is inclined relative to the horizontal and is in fact perpendicular to the central axis 16 of the tapered eccentric bore 15. The annular roller bearings 19, 20 are accurately positioned and centralized relative to their respective axes by the rigid extensions 18, 29 which also serve to lengthen the guide bearings; and are enclosed by a freely rotatable vertically extending sealing ring 49 carried by the rigid flange 17 and coacting through labyrinth seals 64, 65 respectively with the bottom of the head 21 and with the top of a wall 50 formed integral with the frame 4 and providing a lubricant chamber 51. A counterweight 48 which counter-balances the weight of the head 21 relative to the eccentric sleeve 14, is secured to the periphery of the ring 49 between and outwardly beyond the roller thrust bearings 19, 20 near the upper end of the eccentric. The sealing ring 49 additionally coacts with the interior of the annular stationary frame wall 50 through a snap ring 52, thereby effectively protecting the various thrust and guide bearings against entry of foreign matter and possible escape of lubricant.

While the eccentric 14 is suspended directly from the top of the frame hub 5 by virtue of the direct coaction of the flange 17 with the lower thrust bearing 19, the crushing head 21 is supported directly upon the eccentric 14 by virtue of similar coaction with the upper thrust bearing 20, thus concentrating the thrust bearings for both the eccentric and the head as near as possible to the crushing zone 24. The head 21 is positively prevented from shifting sidewise relative to the upper thrust bearing 20, by the rigid eccentric extension 29 and by the tapered shaft 25, the latter being rigidly secured to the head and coacting with the guide bearing or eccentric bore 15 but being freely rotatable therein. The main head protecting mantle 22 which has the crushing surface 23 formed thereon and coacting with the frustro-conical crushing surface 10 of the concave liner 9 to produce the crushing zone 24, is adapted to be firmly secured to the head 21 by means of a mantle attaching stud 53 and nut 54 coacting with an auxiliary upper mantle section 55, and these fastening elements may be protected by means of a cap 56, as shown.

Although the crushing head 21 is freely rotatable relative to the crushing concave 8 and to the eccentric 14, the latter is positively rotatable at any desired speed, by means of the gearing coacting with the lower extremity of the eccentric. The bevel gear 26 is firmly but detachably secured to the bottom of the eccentric 14 by one or more cap screws 58 and a radial key 57 shown in cross-section near the axis 12 relieves these cap screws of shear, and the gear 26 is enclosed within the lubricant confining chamber 51 by a bottom closure plate 59 removal of which gives free access to the gear 26 and pinion 27. The construction of the bevel gear 26 and the attachment thereof to the eccentric 14, are somewhat simplified by eliminating all thrust bearings for the eccentric at the bottom thereof, and the bevel pinion 27 which is secured to the inner end of the driving shaft 28 is also housed within the chamber 51. The horizontal drive shaft 28 is mounted in bearings 60 carried by a tubular bearing box detachably secured to the frame 4, and this shaft 28 may be rotated at any desired speed by means of a pulley or otherwise. In order to insure proper lubrication of all of the bearings, the plate 59, gear 26 and eccentric 14 are provided with suitable lubricant conducting passages, ports and grooves communicating with the chamber 51, and through which lubricant is adapted to be constantly circulated by means of a pump 62 operable by the drive shaft 28 whenever the crusher is operating.

During normal operation of the improved gyratory crusher, when power is applied to the driving pulley 61 and shaft 28, the eccentric 14 will be rotated through the intermeshing gears 27, 26 to gyrate the head 21, and the lubricating pump 62 will be simultaneously actuated to circulate abundant lubricant to all of the bearings and motion transmitting gearing. Raw or fresh material delivered to the supply hopper 40 will gravitate into the crushing zone 24 through the central inlet opening 11 of the concave liner 8, and will gradually advance downwardly and outwardly through this zone 24, being reduced or crushed as it proceeds, by the gyrating head 21 cooperating with the normally fixed concave 8. The finally reduced material is eventually delivered from the annular outlet opening at the discharge end of the zone 24, and drops by gravity through the annular space 7 and slides down the inclined surfaces of the shields 47 to suitable receptacles.

During this reduction of the material, the head 21 and its retaining shaft 25 are free to either revolve with the constantly rotating eccentric 14 and extension 29, or to revolve reversely of the direction or rotation of the eccentric, or to remain fixed with respect to the head axis 16, but the head 21 will be constantly gyrated about the central crusher axis 12 whenever the eccentric is rotating. The major downward pressures exerted upon the head 21 as well as the weight of the eccentric 14 and gear 26, will obviously be borne by the roller thrust bearings 19, 20, and the long guide bearings for the eccentric 14 and shaft 25 afforded by the frame and eccentric bores 6, 15 and by the extensions 18, 29, will be subjected to very slight components of downward pressure and to other components of horizontal or lateral pressure distributed uniformly throughout the extensive areas of these guide bearings. While the roller thrust bearings 20, 19 will obviously permit radial displacement of the head 21 and eccentric sleeve 14 in order to compensate for looseness or wear in the guide bearings 15, 6, the eccentric and hub extensions 29, 18 will also resist any tendency of the thrust bearings 19, 20 to shift laterally to any undesirable extent and will thus maintain these annular bearings generally centralized relative to their respective axes 12, 16. If abnormal pressure develops within the crushing zone 24, the springs 36 will promptly function to relieve such pressures by permitting the concave 8 to rise or tilt with respect to the supporting ring 31, and the degree of reduction of the material may be readily varied by raising or lowering the concave 8 with the aid of the ratchet 43 and lever 44, thus increasing or diminishing the vertical width of the crushing zone 24.

From the foregoing detailed description it will be apparent that my present invention in fact provides a new and useful gyratory reduction crusher which besides being simple, compact and extremely durable in construction, is also highly efficient in operation. The improved construction and disposition of the thrust bearings 20, 19 and their coaction with the rigid annular eccentric and frame extensions 20, 18, insures long life and minimum power consumption by uniformly distributing the vertical and horizontal components of the crushing pressures throughout the extensive bearing surfaces of both the thrust and guide bearings, and eliminates undesirable local pressures and consequent wear on these bearings. This improved arrangement of the anti-friction thrust bearings 19, 20, also produces a very compact but durable bearing assemblage and insures abundant lubrication of all bearings, while also providing a support for the head which may be readily manufactured, assembled and dismantled. The omission of all thrust bearings from the lower end of the eccentric 14 also simplifies the drive and permits convenient and firm attachment and removal of the gear 28 with the aid of the cap screws 58 and key, without disturbing the position of the eccentric 14 and of the elements carried thereby. The mounting of the eccentric 14 in a sturdy hub 5 and integral extension 18 both firmly associated with the main frame 4, obviously permits provision of unobstructed inlet and outlet openings communicating with the crushing zone 24 while still carrying the guide bearings as near as possible toward the inlet, and upon removal of the gear 28 from the lower end of the eccentric 14, and release and removal of the concave 8 and hopper 49 from above, the head 21 and shaft 25, the sealing ring 49, the bearings 19, 20, and the eccentric 14 may be freely vertically or upwardly removed. The flange 17 provides a rigid support for the rotary sealing ring 49 which thoroughly protects the bearings; and the entire crusher is sturdily constructed, has enormous capacity considering the limited space occupied, is operable at high speed to produce crushed product having uniform size and containing minimum fines, and may be readily manufactured to meet diverse conditions of operation.

It should be understood that it is not desired to limit this invention to the exact details of construction or to the precise mode of operation, herein shown and described, for various modifications within the scope of the appended claims may occur to persons skilled in the art; and it is also intended that specific descriptive terms used herein be given the broadest possible interpretation consistent with the disclosure.

I claim:

1. In a gyratory crusher, a frame having an upright central bore, a normally radially loaded bearing extending substantially throughout the length of said frame bore, a normally stationary crushing concave carried by said frame coaxially of said frame bore, a sleeve journalled for rotation in said frame bearing and having an eccentric bore, a normally radially loaded bearing extending substantially throughout the length of said eccentric bore, said sleeve having a single rigid upper flange projecting outwardly over the upper end of said frame bore, a lower thrust bearing comprising an annular series of radial rollers interposed directly between the bottom of said flange and an upper surface of said frame outwardly beyond said frame bearing and constituting the sole means for supporting the weight of said sleeve and of the elements resting thereon, a crushing head disposed above said sleeve and having a rigidly attached depending shaft journalled for free rotation within said eccentric bearing and also having an upper surface cooperating with said concave to provide an annular downwardly and outwardly flaring crushing chamber, an upper thrust bearing comprising an annular series of radial rollers interposed directly between said head and an upper surface of said flange outwardly beyond said eccentric bearing, a vertically extending ring surrounding said flange and having a sealing means between said frame and the ring and also having additional sealing means between said head and the ring, and a counterweight for said head associated with the periphery of said ring between said thrust bearings.

2. In a gyratory crusher, a frame having an upright central bore, a normally radially loaded bearing extending substantially throughout the length of said frame bore, a normally stationary crushing concave carried by said frame coaxially of said frame bore, a sleeve journalled for rotation in said frame bearing and having an eccentric bore the axis of which intersects the axis of said frame bearing above said sleeve, a normally radially loaded bearing extending substantially through the length of said eccentric bore, said sleeve having a single rigid upper flange projecting outwardly over the upper end of said frame bore, a lower thrust bearing interposed directly between the bottom of said flange and an upper surface of said frame outwardly beyond said frame bearing and constituting the sole means for supporting the weight of said sleeve and of the elements resting thereon, said lower thrust bearing having an annular series of radial rollers lying in a plane perpendicular to said frame bore, a crushing head disposed above said sleeve and having a rigidly attached depending shaft journalled for free rotation within said eccentric bearing and also having an upper surface cooperating with said concave to provide an annular downwardly and outwardly flaring crushing chamber, an upper thrust bearing interposed directly between said head and an upper surface of said flange outwardly beyond said eccentric bearing, said upper thrust bearing having an annular series of radial rollers lying in a plane perpendicular to said eccentric bore, a vertically extending ring surrounding said flange and having sealing means between said frame and the ring and also having additional sealing means between said head and the ring, and a counterweight for said head carried by the periphery of said ring between said roller thrust bearings.

3. In a gyratory crusher, a frame having a rigid annular upper extension and an upright bore, a normally radially loaded bearing extending substantially throughout the length of said frame bore, a normally stationary crushing concave carried by said frame coaxially of said frame bore, a sleeve journalled for rotation in said frame bearing and having a rigid annular upper extension and an eccentric bore, a normally radially loaded bearing extending substantially throughout the length of said eccentric bore, said sleeve having a single rigid upper flange projecting outwardly from beneath the top of its said extension over the upper end of said frame extension and bore, a lower thrust bearing comprising an annular series of radial cylindrical rollers surrounding said frame extension and being interposed directly between the bottom of said flange and an upper surface of said frame outwardly beyond said frame bearing and constituting the sole means for supporting the weight of said sleeve and of the elements resting thereon, a crushing head disposed above said sleeve and having a rigidly attached depending shaft journalled for free rotation within said eccentric bearing and also having an upper surface cooperating with said concave to provide an annular downwardly and outwardly flaring crushing chamber, an upper thrust bearing comprising an annular series of radial cylindrical rollers surrounding said sleeve extension and being interposed directly between said head and an upper surface of said flange outwardly beyond said eccentric bearing, a vertically extending ring surrounding said flange and having sealing means between said frame and the ring and also having additional sealing means between said head and the ring, and a counterweight for said head suspended from the periphery of said ring between said thrust bearings.

HARVEY H. RUMPEL.

REFERENCES CITED

The following references are of record in the file of this patent:

UNITED STATES PATENTS

| Number | Name | Date |
|---|---|---|
| 1,000,049 | Symons | Aug. 8, 1911 |
| 1,031,083 | Newhouse | July 2, 1912 |
| 1,083,283 | Kelly | Jan. 6, 1914 |
| 1,537,564 | Symons | May 12, 1925 |
| 1,575,874 | Symons | Mar. 9, 1926 |
| 1,609,594 | Anderson | Dec. 7, 1926 |
| 1,993,900 | Rumpel | Mar. 12, 1935 |
| 2,110,276 | Rumpel | Mar. 8, 1938 |
| 2,185,528 | Stevens | Jan. 2, 1940 |
| 2,231,491 | Bousman | Feb. 11, 1941 |

FOREIGN PATENTS

| Number | Country | Date |
|---|---|---|
| 673,351 | Germany | Mar. 20, 1939 |
| 66,645 | Norway | Aug. 16, 1943 |